(12) United States Patent
Bitterfeld et al.

(10) Patent No.: US 11,632,303 B2
(45) Date of Patent: Apr. 18, 2023

(54) ENHANCED SERVICE MAPPING BASED ON NATURAL LANGUAGE PROCESSING

(71) Applicant: ServiceNow, Inc., Santa Clara, CA (US)

(72) Inventors: Robert Bitterfeld, Petah Tikva (IL); Asaf Garty, Petah Tikva (IL)

(73) Assignee: ServiceNow, Inc, Santa Clara, CA (US)

( * ) Notice: Subject to any disclaimer, the term of this patent is extended or adjusted under 35 U.S.C. 154(b) by 108 days.

(21) Appl. No.: 17/065,381

(22) Filed: Oct. 7, 2020

(65) Prior Publication Data

US 2022/0109611 A1    Apr. 7, 2022

(51) Int. Cl.
*H04L 41/14*     (2022.01)
*H04L 43/045*    (2022.01)
(Continued)

(52) U.S. Cl.
CPC ............. *H04L 41/14* (2013.01); *G06F 8/65* (2013.01); *G06F 40/109* (2020.01); *G06F 40/40* (2020.01);
(Continued)

(58) Field of Classification Search
CPC . H04L 41/12; H04L 41/0893; H04L 41/0803; H04L 63/1408; H04L 43/045; G06F 16/285; G06F 16/288
See application file for complete search history.

(56) References Cited

U.S. PATENT DOCUMENTS 4,941,084 A    7/1990   Terada et al.
5,185,860 A    2/1993   Wu
(Continued)

FOREIGN PATENT DOCUMENTS

| EP | 0433979 | 6/1991 |
|---|---|---|
| EP | 1607824 | 12/2005 |
| WO | WO 99/34285 | 7/1999 |
| WO | WO 00/52559 | 9/2000 |
| WO | WO 01/79970 | 10/2001 |

OTHER PUBLICATIONS

Servicenow, "Paris IT Operations Management", Sep. 16, 2020, 542 pages.
(Continued)

*Primary Examiner* — Tom Y Chang
(74) *Attorney, Agent, or Firm* — McDonnell Boehnen Hulbert & Berghoff LLP

(57) ABSTRACT

A computing system includes persistent storage configured to store representations of software applications that include textual data respectively indicative of attributes of the software applications, and a mapping application configured to perform operations. The operations include retrieving a representation corresponding to a software application and, based thereon, identifying character strings present within textual data associated therewith. The operations also include generating, for each character string, a corresponding weight based on a frequency of the character string within the particular textual data and a frequency of the character string within textual data associated with at least a subset of the software applications. The operations additionally include selecting, from the character strings and based on the corresponding weights, candidate tags for the particular software application. The operations further include generating a mapping between the software application and a computing resource based on the candidate tags, and storing a representation of the mapping.

20 Claims, 10 Drawing Sheets

(51) Int. Cl.
*G06F 40/40* (2020.01)
*G06F 8/65* (2018.01)
*H04L 41/22* (2022.01)
*G06F 40/109* (2020.01)
*H04L 41/0853* (2022.01)
*H04L 41/12* (2022.01)

(52) U.S. Cl.
CPC .......... *H04L 41/22* (2013.01); *H04L 41/0853* (2013.01); *H04L 41/12* (2013.01); *H04L 43/045* (2013.01)

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 3,060,396 A1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2015/0006531 A1* | 1/2015 | Deshpande ............ G06F 16/783 707/737 |
| 2016/0004764 A1* | 1/2016 | Chakerian ............. G06F 16/285 707/737 |
| 2016/0359872 A1* | 12/2016 | Yadav ................. H04L 63/1408 |
| 2019/0220695 A1* | 7/2019 | Nefedov ................ G06N 5/022 |
| 2021/0157858 A1* | 5/2021 | Stevens ............. G06F 16/90335 |
| 2021/0248105 A1* | 8/2021 | Gentile .................. G06N 5/022 |
| 2021/0389877 A1* | 12/2021 | Liu ....................... G06F 9/5011 |

OTHER PUBLICATIONS

U.S. Appl. No. 16/445,914, filed Jun. 19, 2019, inventors: Alexandra Feiguine, Shay Herzog, Shiri Hameiri, Daniel Badyan, Asaf Garty, Robert Bitterfeld.

U.S. Appl. No. 16/896,900, filed Jun. 9, 2020, inventors: Asi Garty, Robert Bitterfeld.

Stemming and lemmatization, https://nlp.stanford.edu/IR-book/html/htmledition/stemming-and-lemmatization-1.html, printed on Oct. 6, 2020, 3 pages.

Wikipedia, tf-idf, printed on Oct. 6, 2020, 7 pages.

* cited by examiner

ENHANCED SERVICE MAPPING BASED ON NATURAL LANGUAGE PROCESSING

BACKGROUND

Computing devices, software applications, storage structures, and other computing resources that make up a computer network may be discovered and the relationships therebetween may be mapped. Representations of these elements of the computer network, as well as the relationships, may be stored in a database. The stored representation may later be retrieved and used to generate a visualization of a state or arrangement of these elements within the computer network, or used for other purposes. Discovering computing resources involves developing software processes that are capable of gathering the information needed for detection, classification, and/or identification of these computing resources.

SUMMARY

Computing resources associated with a managed network may be discovered and/or mapped by way of discovery patterns. Each discovery pattern may define operations configured to gather information associated with discovering and/or mapping a corresponding computing resource, such as a name of the computing resource and various attributes thereof. In some cases, as the computing resources change over time due to updates, configuration changes, new use cases, and/or other modifications, continued discovery and mapping of these computing resources may involve some changes to the corresponding discovery patterns. As the number of computing resources and/or corresponding discovery patterns grows, it may become difficult, impractical, and/or infeasible to maintain the discovery patterns up-to-date in view of modifications to the computing resources. Thus, it may be desirable to provide other approaches to discovery and/or mapping of computing resources that more efficiently scale with the number and/or types of computing resources.

One such approach involves using various natural language processing (NLP) techniques, algorithms, and/or models to generate tags for computing resources. Such tags may be used to map the relationships between the computing resources. Specifically, a discovery pattern may be configured to gather textual data associated with a computing resource, such as a software application. The textual data may include, for example, file names of files associated with the computing resource, file system paths associated with these files, commands used to invoke and/or access the computing resource, and/or inputs provided to the computing resource, among other possibilities.

The textual data may be processed by adjusting the letter case of one or more characters, removing predetermined characters, and/or determining the root forms of one or more words therein, among other possibilities. This processing may generate a plurality of character strings associated with the computing resource. A frequency-based weight may be generated for each respective character string of the plurality of character strings based on a frequency with which the respective character string appears within the textual data associated with the computing resource, and/or within other textual data associated with other computing resources. Thus, the frequency-based weight may indicate the extent to which each character string uniquely and/or specifically describes the computing resource.

Based on the frequency-based weight and/or the individual frequencies represented thereby, candidate tags may be selected for the computing resource. Thus, the candidate tags may include, for example, up to a predetermined number of character strings that uniquely and/or most specifically describe the computing resource and/or its relationships to other computing resources. The candidate tags selected for the computing resource may be used to identify one or more other computing resources associated with one or more of the same tags, and the computing resource may be mapped to the one or more other computing resources.

The same or similar procedure may be used to generate candidate tags for a variety of different computing resources because no particular format, structure, and/or arrangement of the textual data is assumed and/or depended on. Thus, as the format, structure, and/or arrangement of the textual data associated with a particular computing resource changes over time, the same or similar procedure may be used to generate updated candidate tags therefor. Accordingly, maintaining the discovery patterns up-to-date in view of modifications to the computing resources may involve updating operations that collect the textual data, while operations on the collected textual data may remain unchanged, thereby simplifying the maintenance of the discovery patterns.

Additionally, in some cases, processing of the textual data may result in generation of candidate tags that reveal relationships between computing resources that might not otherwise be easily identifiable and/or identifiable at all. For example, when the textual data does not adhere to a standardized and/or predetermined format (e.g., when the textual data varies across users or groups thereof), it may be difficult, impractical, and/or infeasible to use non-NLP-based operations to identify specific attributes of the computing resources.

Accordingly, a first example embodiment may involve retrieving, from persistent storage configured to store a plurality of representations of a plurality of software applications, a representation corresponding to a particular software application. The representations may include textual data respectively indicative of attributes of the software applications. The first example embodiment may also involve identifying, based on the representation corresponding to the particular software application, a plurality of character strings present within particular textual data associated with the particular software application. The first example embodiment may additionally involve generating, for each respective character string of the plurality of character strings, a corresponding weight based on (i) a frequency of the respective character string within the particular textual data and (ii) a frequency of the respective character string within textual data associated with at least a subset of the plurality of software applications. The first example embodiment may yet additionally involve selecting, from the plurality of character strings and based on the corresponding weight determined for each respective character string, up to a predetermined number of candidate tags for the particular software application. The first example embodiment may further involve generating a mapping between the particular software application and a computing resource based on the candidate tags including at least one tag corresponding to the computing resource. The first example embodiment may yet further involve storing, in the persistent storage, a representation of the mapping.

In a second example embodiment, a computing system may include persistent storage configured to store a plurality of representations of a plurality of software applications.

The representations may include textual data respectively indicative of attributes of the software applications. The computing system may also include a mapping application configured to perform operations. The operations may include retrieving, from the persistent storage, a representation corresponding to a particular software application. The operations may also include identifying, based on the representation corresponding to the particular software application, a plurality of character strings present within particular textual data associated with the particular software application. The operations may additionally include generating, for each respective character string of the plurality of character strings, a corresponding weight based on (i) a frequency of the respective character string within the particular textual data and (ii) a frequency of the respective character string within textual data associated with at least a subset of the plurality of software applications. The operations may yet additionally include selecting, from the plurality of character strings and based on the corresponding weight determined for each respective character string, up to a predetermined number of candidate tags for the particular software application. The operations may further include generating a mapping between the particular software application and a computing resource based on the candidate tags including at least one tag corresponding to the computing resource. The operations may yet further include storing, in the persistent storage, a representation of the mapping.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
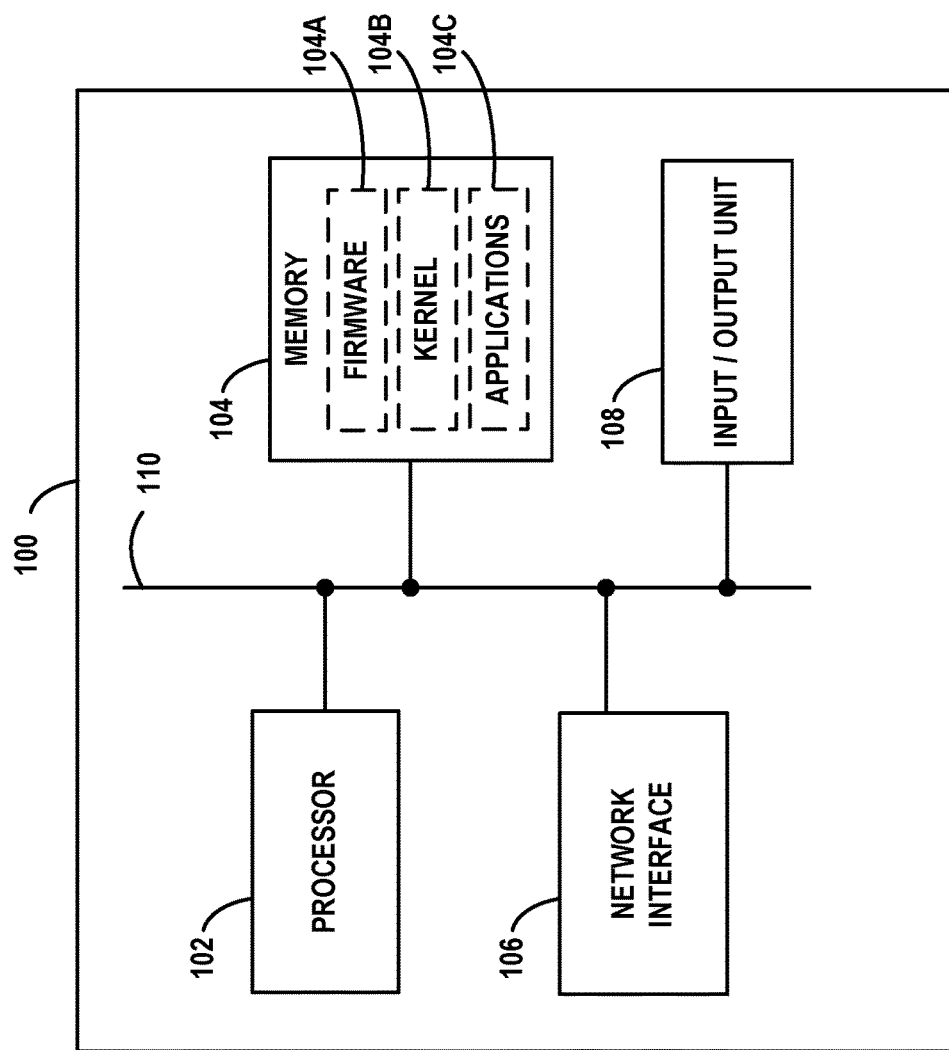
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
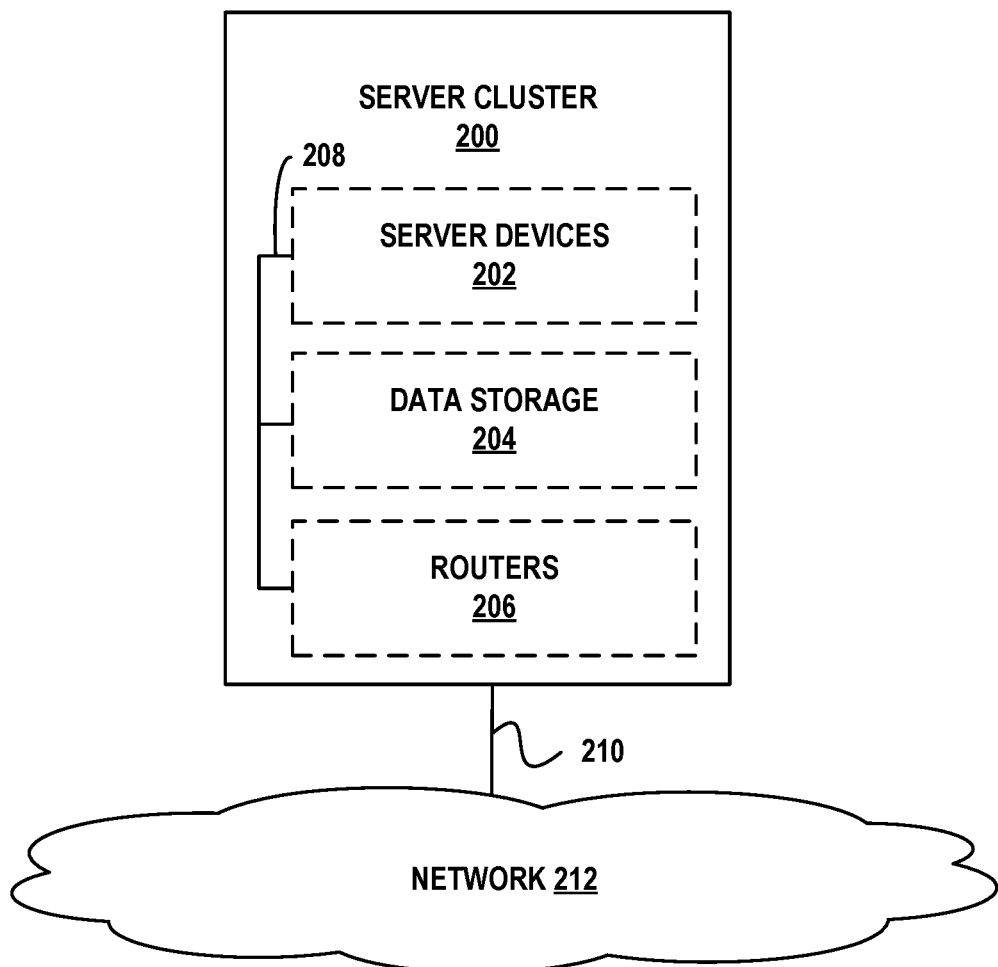
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
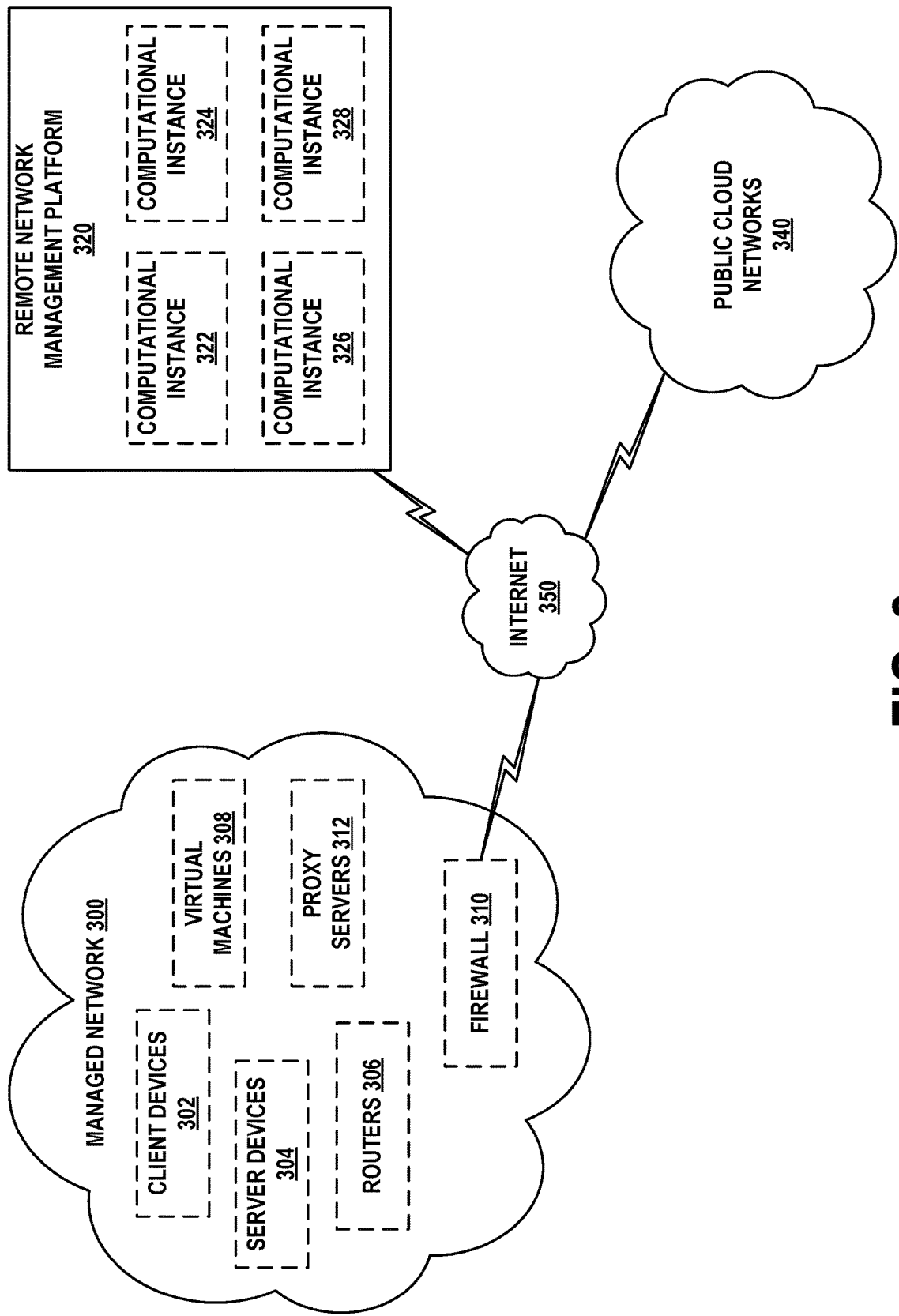
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300.

By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
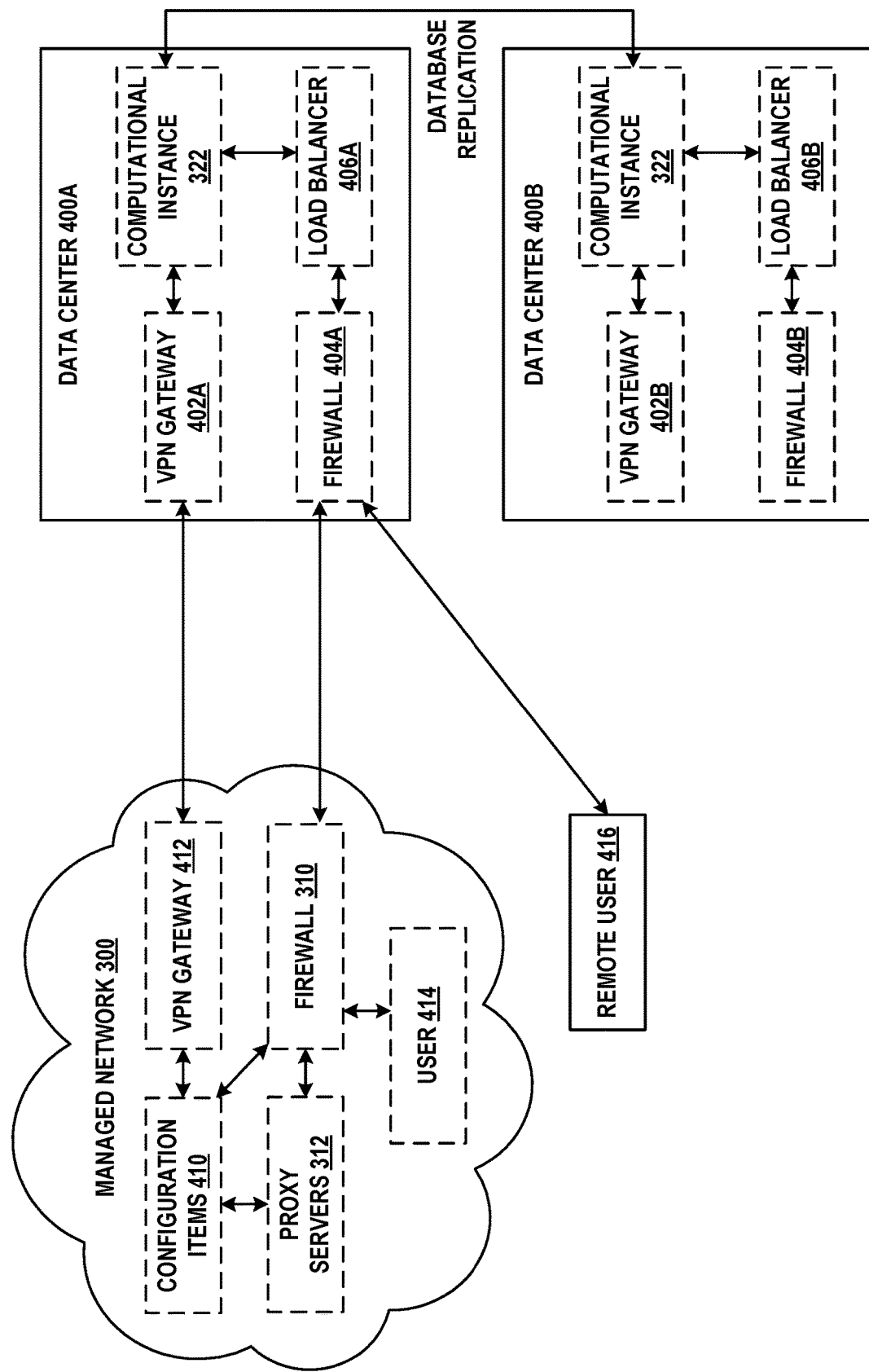
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
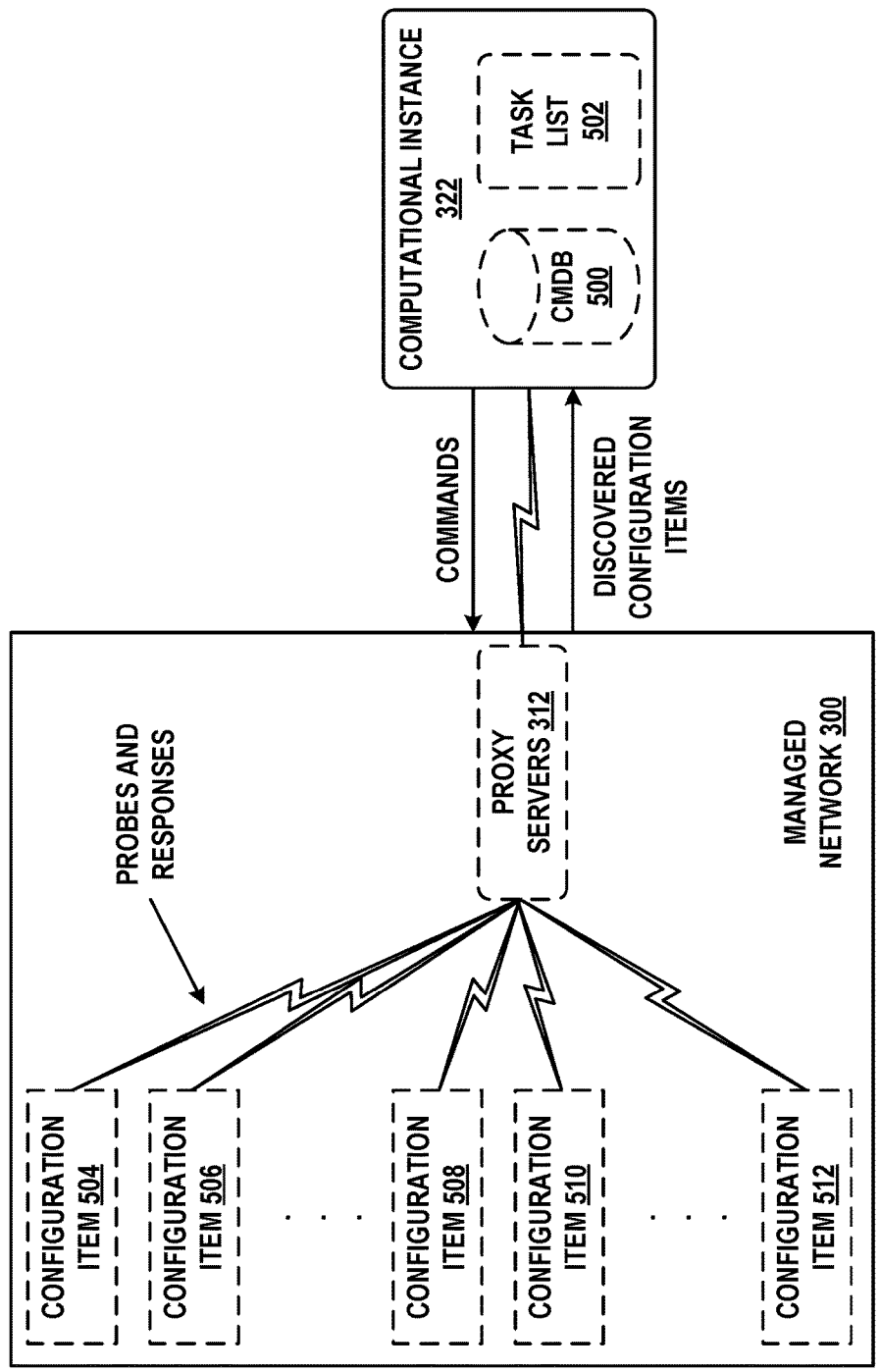
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
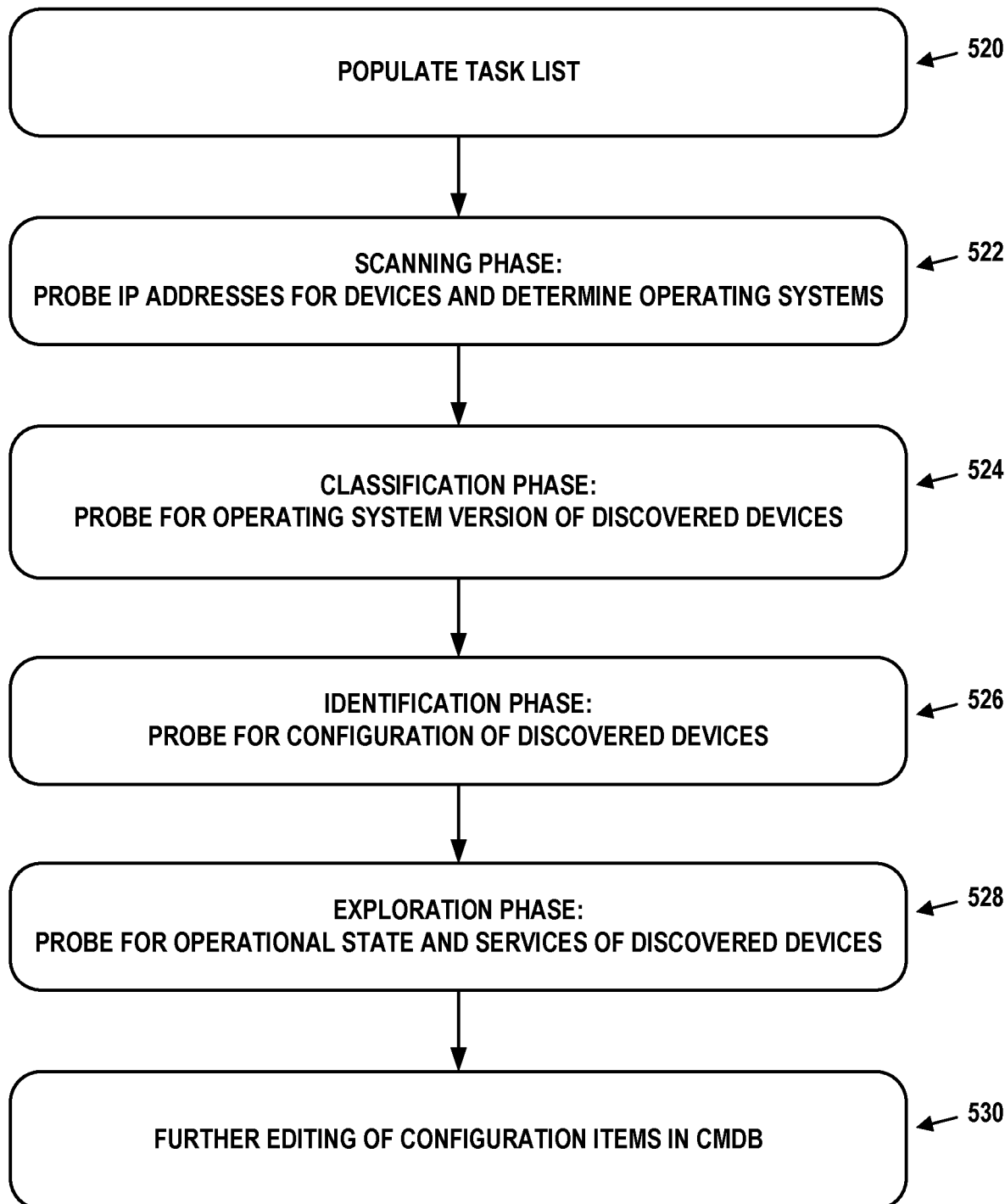
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE APPLICATION TAGGING OPERATIONS

Discovery and/or mapping of a particular computing resource, such as a computing device or software application, may involve the execution of resource-specific discovery operations, which may be referred to as a discovery pattern. These resource-specific discovery operations may be configured to obtain one or more particular units of information/data from the particular computing resource using an interface provided by the computing resource and/or other related computing resources. Thus, as the particular computing resource changes/updates over time, continued discovery of the particular computing resource by the discovery pattern may involve changing/updating the resource-specific discovery operations. As the number of different resource-specific discovery operations increases, it may become increasingly difficult, impractical, and/or infeasible to maintain all of the resource-specific discovery patterns up-to-date in view of changes/updates made to the corresponding computing resources. Accordingly, provided herein are systems and operations that use natural language processing (NLP) algorithms and/or models to provide scalable and/or resource-independent discovery and/or mapping operations.

Figure 6:
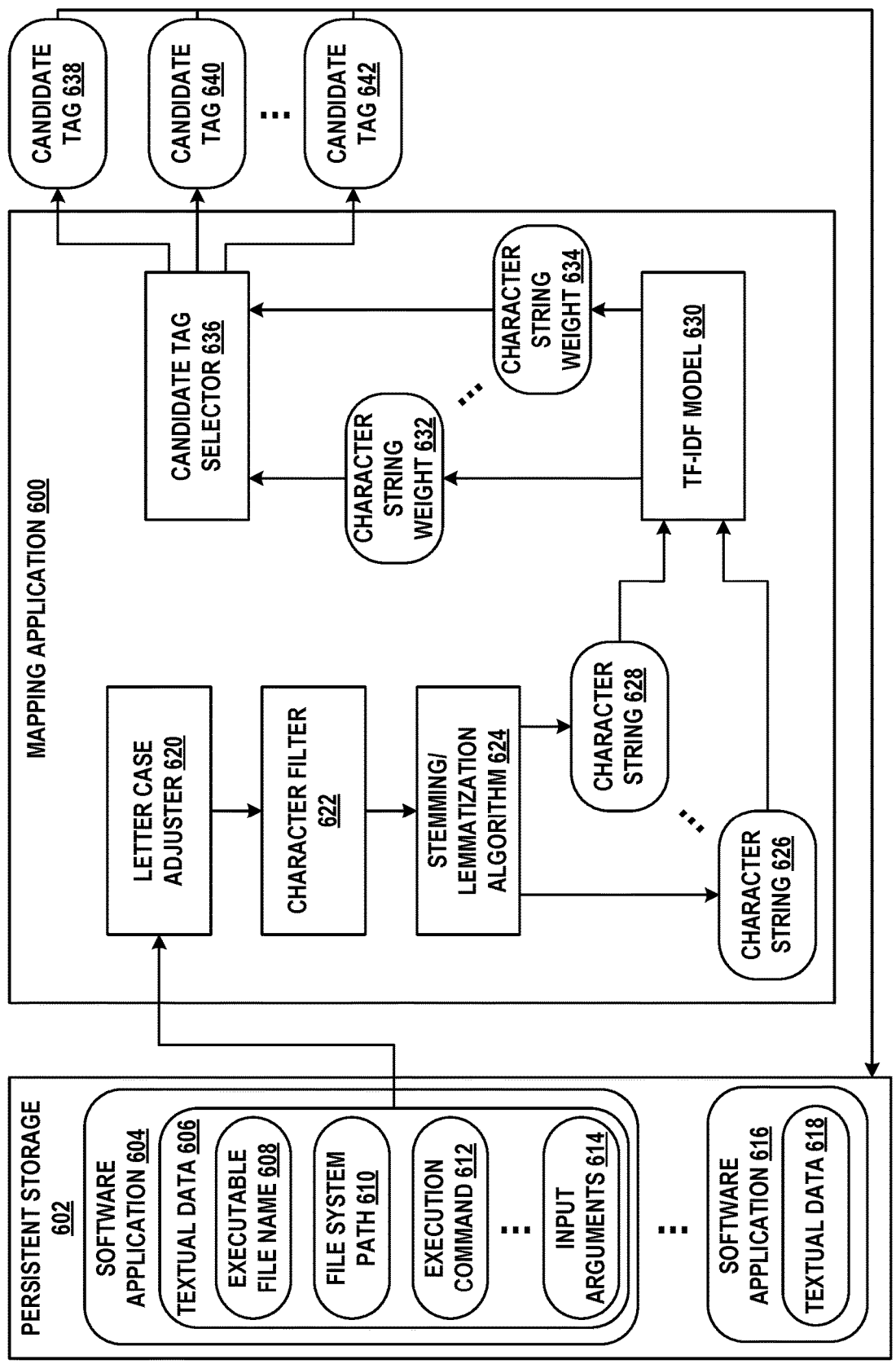
FIG. 6 illustrates a system, in accordance with example embodiments.

FIG. 6 illustrates a mapping software application configured to generate candidate tags for a software application based on textual data discovered in connection with the software application. These candidate tags may be used to map the software application to one or more other computing resources, thus creating a representation of the computing environment and/or context in which the software application operates.

Specifically, FIG. 6 illustrates mapping application 600 and persistent storage 602. In some implementations, mapping application 600 and/or persistent storage 602 may be disposed within computational instance 322. Mapping application 600 may be configured to communicate with proxy servers 312 to perform at least some discovery operations. Thus, in some cases, mapping application 600 may alternatively be referred to as a discovery application, or a discovery and mapping application. Persistent storage 602 may represent, for example, CMDB 500 or some other database in which mapping application 600 may be configured to store information collected as a result of the discovery and/or mapping operations.

Mapping application 600 may include letter case adjuster 620, character filter 622, stemming/lemmatization algorithm 624, term frequency-inverse document frequency (tf-idf) model 630 and candidate tag selector 636. Persistent storage 602 may be configured to store therein representations of software application 604—software application 616 (i.e., software applications 604-616). In some cases, the representations of software applications 604-616 may take the form of configuration items.

The corresponding representation of each respective software application of software applications 604-616 may be generated based on one or more software processes corresponding to the respective software application. A software process may represent a particular instantiation and/or occurrence of execution of the software application by a computing device, and may include one or more threads. The software processes of a respective software application may be executed at various different times and/or on various different computing devices. Thus, the corresponding representation may be indicative of attributes of the respective software application associated with a plurality of different operational/executional contexts. In some cases, data associated with each of the one or more software processes may be processed by one or more machine learning models (e.g., an artificial neural network) to generate at least part of the corresponding representation of the respective software application.

Each of software applications 604-616 may be associated with corresponding textual data 606-618. Specifically, software application 604 may be associated with textual data 606 and software application 616 may be associated with textual data 618. The textual data may include any series of one or more characters generated by the corresponding software application, stored in one or more files associated with the corresponding software application, provided as input to the corresponding software application, generated by one or more other software applications communicatively connected to the corresponding software application, and/or generated by a computing device in connection with execution of the software application, among other possibilities. Thus, the textual data may be obtained from one or more sources expected to contain words, terms, and/or phrases that are indicative of attributes of the corresponding software application and/or relationships between the corresponding software application and other computing resources.

In one example, textual data 606 may include software process data generated by an operating system of a computing device in connection with one or more software processes associated with execution of software application 604. The software process data may be generated in different ways depending on the operating system. For example, on UNIX® and/or a UNIX®-like operating systems, the software process data may be generated by the "process status" ("ps") command/program. In another example, on WINDOWS® operating systems, the software process data may be generated by the "tasklist" command/program, and/or the "process" command/program provided as part of WINDOWS® management instrumentation command-line ("wmic").

Thus, textual data 606 may include, for example, executable file name 608, file system path 610, execution command 612, and/or input arguments 614, among other information contained in the software process data. Textual data 618 may include commensurate information (not shown) with respect to software application 616. Executable file name 608 may indicate the name of an executable file that (i) stores instructions that define at least part of software application 604 and/or (ii) is selected and/or used to execute at least part of software application 604. File system path 610 may indicate a location and/or address within a file system of the computing device at which the executable file and/or another file related to software application 604 is stored. Execution command 612 may indicate a command provided to, for example, an operating system shell to cause/initiate execution of software application 604. Input arguments 614 may indicate one or more inputs provided to software application 604 upon initiation of execution thereof and/or during execution thereof.

Mapping application 600 may be configured to process textual data 606-618 associated with software applications 604-616, respectively, to generate candidate tags for one or more of software applications 604-618. The candidate tags generated by mapping application 600 may be used to determine one or more mappings (e.g., relationships) between the one or more of software application 604-618 and other computing resources.

For example, mapping application 600 may be configured to generate candidate tag 638 and candidate tags 640 through 642 (i.e., candidate tags 638-642) for software application 604. To that end, letter case adjuster 620 may be configured to adjust a letter case of one or more characters in textual data 606. For example, letter case adjuster 620 may be configured to convert one or more lower-case letters to upper case, and/or convert one or more upper-case letters to lower case. Thus, in some cases, all letters in textual data 606 may have uniform case after processing by letter case adjuster 620.

Character filter 622 may be configured to remove one or more predetermined characters from textual data 606. In one example, character filter 622 may be configured to remove one or more "special" non-alphanumeric characters (e.g., "!", "@", "#", "$", "%", "^", "&", "*", "(", ")", "-", etc.). In another example, character filter 622 may be configured to remove one or more predetermined character strings, which may include alphanumeric and/or non-alphanumeric characters. Thus, character filter 622 may be configured to filter out from textual data 606 one or more characters that are not expected to be useful in distinguishing one software application from another. Alternatively, in some implementations, textual data 606 may first be processed by character filter 622 and subsequently by letter case adjuster 620.

Stemming/lemmatization algorithm 624 may be configured to generate a root form of one or more words found in textual data 606. Stemming/lemmatization algorithm 624 may include one or more stemming algorithms and/or one or more lemmatization algorithms. The one or more stemming algorithms may be configured to generate the root form of a particular word by removing a portion of the word. For example, the stemming algorithms may be configured to remove "es" from the word "studies" to generate the root form "studi," or remove "ing" from the word "studying" to generate the root form "study." Thus, in some cases, the stemming algorithms may generate root forms that are not dictionary word (e.g., "studi"). The one or more lemmatization algorithms may be configured to generate the root form of a particular word by determining the dictionary form, or lemma, of the particular word. For example, the lemmatization algorithms may be configured to determine "study" to be the dictionary form of both the word "studies" and the word "studying."

By generating the root form of words found in textual data 606-618, mapping application 600 may be configured to generate candidate tags that are relatively easier to compare to other tags. For example, the tags of different software applications and/or other computing resources may be compared using string comparisons. Thus, letter case adjuster 620, character filter 622, and/or stemming/lemmatization algorithm 624 may operate to standardize and/or normalize textual data 606 for tf-idf model 630 and/or candidate tag selector 636.

Stemming/lemmatization algorithm 624 may be configured to generate character string 626 through character string 628 (i.e., character strings 626-628). In implementations where letter case adjuster 620, character filter 622, and/or stemming/lemmatization algorithm 624 process textual data 606 in a different order than shown, character strings 626-628 may instead be generated by letter case adjuster 620 or character filter 622.

Each of character strings 626-628 may include one or more words, terms, and/or phrases detected based on textual data 606. Some of the one or more words, terms, and/or phrases may be explicitly present within textual data 606, while others may represent one or more transformed versions of the content of textual data 606. Character strings 626-628 may provide a pool of words, terms, and/or phrases associated with software application 604 from which candidate tags 638-642 may be selected.

In some implementations, each of character strings 626-628 may be distinct (e.g., unique), such that multiple instances of a particular word, term, and/or phrase are represented by one, rather than multiple, of character strings 626-628. Each of character strings 626-628 may be associated with a count representing a number of instances of the corresponding character sting in textual data 606. In other implementations, character strings 626-628 might not be distinct, such that multiple instances of a particular word, term, and/or phrase are represented by multiple, rather than one, of character strings 626-628. Thus, tf-idf model 630 may be configured to determine the count representing the number of instances in textual data 606 of each distinct character string of character strings 626-628.

Tf-idf model 630 may be configured to generate, for each of distinct character string of character strings 626-628, a corresponding character string weight, which may alternatively be referred to as a weight, a frequency-based weight, a tf-idf weight, a score, a character string score, frequency-based score, and/or a tf-idf score. For example, in cases where each of character strings 626-628 represent a distinct character string, tf-idf model 630 may be configured to generate character string weight 632 through character string weight 634 (i.e., character string weights 632-634) corresponding to character strings 626-628, respectively. Each of character string weights 632-634 may be based on (i) a first frequency of the corresponding character string within textual data 606 (e.g., before and/or after processing by letter case adjuster 620, character filter 622, and/or stemming/lemmatization algorithm 624) and (ii) a second frequency of the corresponding character string within textual data associated with at least one other software application of software applications 604-616.

For example, character string weight 632 corresponding to character string 626 may be based on (i) a first frequency with which character string 626 appears in textual data 606 and (ii) a second frequency with which character string 626 appears in a character string corpus based on textual data 606-618. For example, the character string corpus may be based on a subset of textual data 606-618 that includes textual data associated with at least one software application other than software application 604. Specifically, character string weight 632 may be based on a product of the first frequency and an inverse of the second frequency. Thus, in order to generate character string weights 632-634, mapping application 600 may be configured to generate the character string corpus by determining (in a manner similar or identical to that described above for character strings 626-628) one or more character strings present within the corresponding subset of textual data 606-618. The second frequency may be determined by calculating how frequently character string 626 appears within the character string corpus.

Thus, character string weight 632 may increase based on character string 626 appearing more frequently within textual data 606, and may decrease based on character string 626 appearing more frequently within the character string corpus. Character strings that appear frequently within textual data 606 and within the corpus may be relatively less useful in distinguishing software application 604 from other software applications, since such character strings might not be unique and/or specific to software application 604. On the other hand, character strings that appear frequently within textual data 606 and infrequently within the corpus may be more useful in distinguishing software application 604 from the other software applications, since such character strings may be unique and/or relatively more specific to software application 604.

The subset of textual data 606-618 used to generate the character string corpus may be based on the managed network to which the software application being tagged belongs. Specifically, software applications 604-616 may each belong to a corresponding managed network. In one example, software application 604 may belong to a first managed network, and the subset of textual data 606-618 used to generate the character string corpus may include textual data associated with a plurality of other software applications that also belong to the first managed network. Thus, character string weights 632-634 may score each of character strings 626-628 in the context of the first managed network, and may thus be more network-specific. In another example, software application 604 may belong to a first managed network, and the subset of textual data 606-618 used to generate the character string corpus may include textual data associated with a plurality of software applications that belong to the first managed network and at least one other managed network. Thus, character string weights 632-634 may score each of character strings 626-628 in the context of multiple managed networks, and may thus be more network-agnostic. In a further example, both approaches may be used in combination, resulting in two or more sub-weights being used to generate the corresponding character string weight for each of character strings 626-628.

Accordingly, character string weights 632-634 may indicate an extent to which each of character strings 626-628 is uniquely and/or specifically descriptive of software application 604. Candidate tag selector 636 may be configured to determine candidate tags 638-642 based on character string weights 632-634 and/or the individual frequencies used to generate these weights. Specifically, candidate tag selector 636 may be configured to select, from character strings 626-628, a set of character strings associated with corresponding character string weights that exceed a threshold weight. This set of character strings may thus include a subset of character strings 626-628 that is more specifically descriptive of software application 604 than other, non-selected character strings. The threshold weight may be adjustable to control the size of the set.

Candidate tag selector 636 may be further configured to select, from the set of character strings associated with corresponding character string weights that exceed the threshold weight, up to a predetermined number of character strings that appear most frequently within textual data 606. This predetermined number of character strings that appear most frequently within textual data 606 may form candidate tags 638-642. For example, candidate tag selector 636 may be configured to generate N candidate tags, where N is equal to 2, 3, 4, 5, or another number. Thus, candidate tag selector 636 may select, from the set of character strings associated with corresponding character string weights that exceed the threshold weight, N character strings associated with N highest corresponding frequencies of appearance within textual data 606. Accordingly, overall, candidate tag selector 636 may select, from character strings 626-628, N character strings associated with (i) corresponding character string weights that exceed the threshold weight and (ii) N highest corresponding frequencies of appearance within textual data 606. Candidate tags 638-642 may thus include a predetermined number of character strings 626-628 that are uniquely and/or most specifically descriptive of software application 604. In cases where fewer than N character strings are available, the predetermined number of candidate tag may be less than N.

Mapping application 600 may be configured to store candidate tags 638-642 as part of the representation of software application 604 in persistent storage 602, as indicated by the line feeding back from candidate tags 638-642 to persistent storage 602. A similar set of candidate tags may be determined for and stored in association with other software applications of software applications 604-616. Thus, each respective software application of software applications 604-616 may be associated with up to a predetermined number of words, terms, and/or phrases that uniquely and/or most specifically describe the respective software application and/or the context in which the respective software application operates.

Candidate tags 638-642 may be used to generate one or more mappings between software application 604 and other discovered computing resources. For example, the other computing resources may include other software applications, computing devices on which software applications 604-616 are executed, and/or software services that are made up of and/or provided at least in part by one or more of software application 604-616. Thus, in some cases, persistent storage 602 may additionally store representations of the computing devices and/or software services, each of which may be associated with corresponding one or more tags.

Mapping application 600 may be configured to map software application 604 to a particular computing resource based on candidate tags 638-642 including at least one tag corresponding to the particular computing resource. In some implementations, mapping application 600 may be configured to generate the mapping automatically by comparing candidate tags 638-642 to a plurality of tags associated with a plurality of computing resources. When one of candidate tags 638-642 matches a tag corresponding to a computing resource, software application 604 may be mapped to that computing resource.

In other implementations, mapping application 600 may be configured to generate the mapping based on user input. Specifically, candidate tags 638-642 may be displayed by way of a user interface, and a selection of one or more of candidate tags 638-642 may be received by way of the user interface. Mapping application 600 may assign the selected one or more tags to software application 604. Mapping application 600 may be configured to generate the mapping based on the user input by comparing the selected one or more tags (rather than each of the candidate tags) to the plurality of tags associated with the plurality of computing resources. When one of the selected one or more tags matches a tag corresponding to a computing resource, software application 604 may be mapped to that computing resource. Similar operations may be carried out with respect to other software applications of software applications 604-616.

Accordingly, software application 604 may be mapped to one or more other computing resources by mapping application 600 using application-agnostic operations, which may include operations that may be used for tagging each of software application 604-616, rather than, for example, only one particular software application and/or one particular type of software application. Specifically, mapping application 600 may be configured to collect textual data 606 associated with software application 604 (in some cases, using application-specific operations) and, through an application-agnostic NLP process, identify candidate tags 638-642 that are descriptive of software application 604, the operating context thereof, and/or attributes thereof. The same application-agnostic NLP process may be used with respect to other software applications to identify candidate tags specific to each of these other software applications. Thus, as the content and/or format of textual data 606-616 changes over time, and/or additional textual data associated with additional software applications is discovered, the application-agnostic NPL process may continue to be used for tagging and mapping thereof.

Figure 7A:
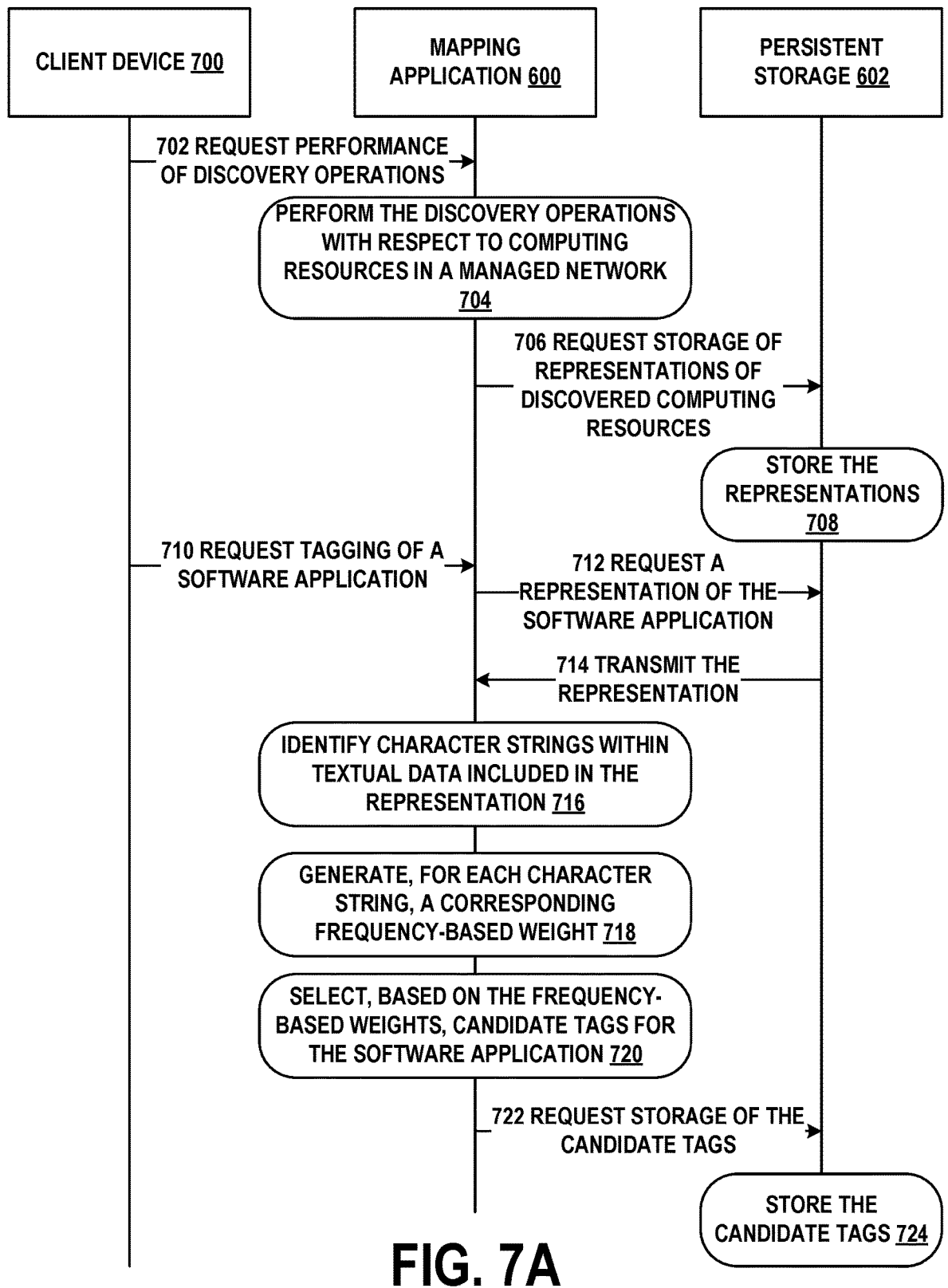
FIGS. 7A and 7B illustrate a message flow diagram, in accordance with example embodiments.
Figure 7B:
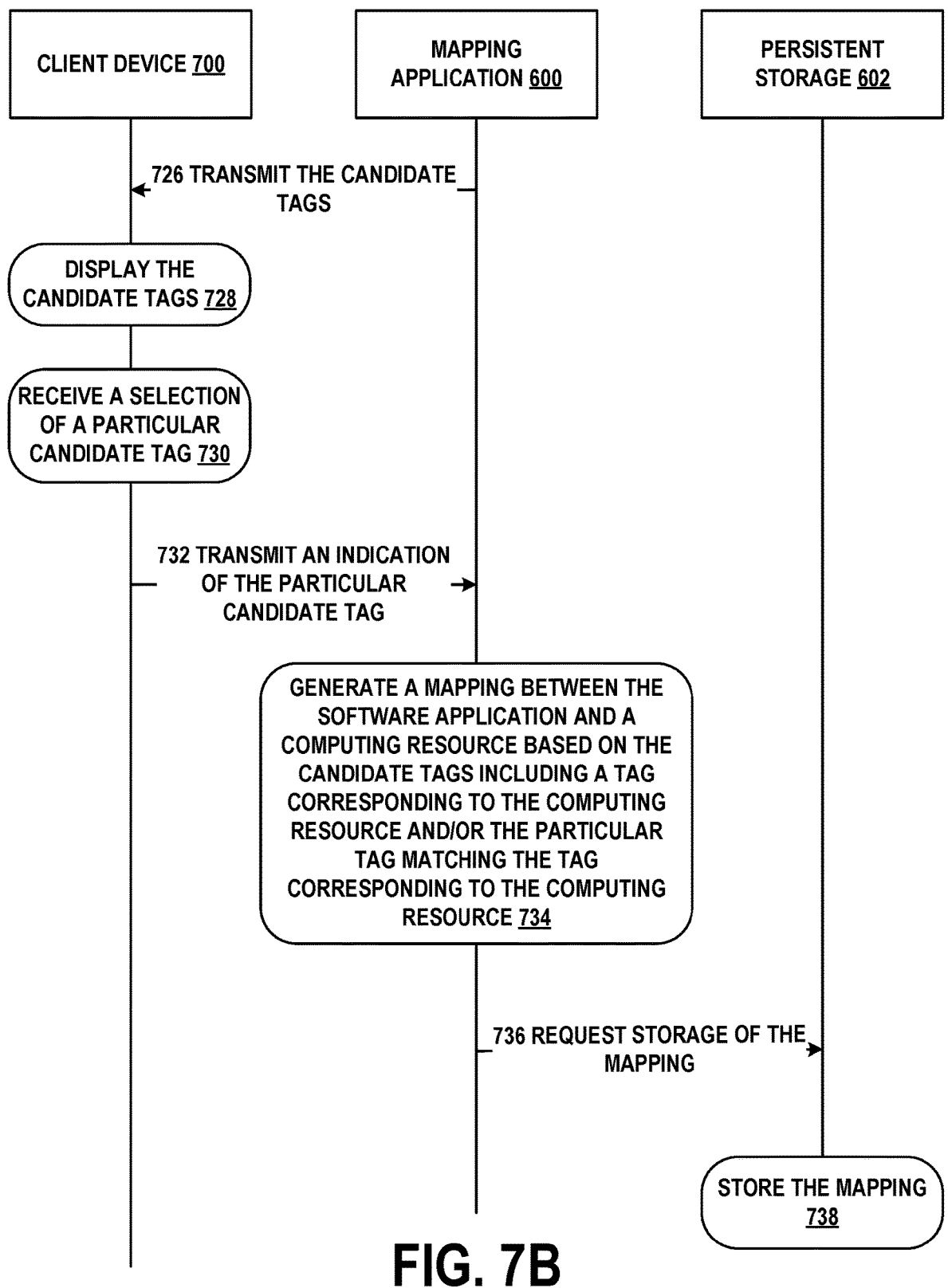

FIGS. 7A and 7B illustrate a message flow diagram of various operations involving mapping application 600. Specifically, mapping application 600 may be communicatively connected to client device 700 and persistent storage 602. Client device 700 may be a user device, such as a desktop computer, tablet computer, smartphone, and/or other computing device, through which a user may interact with (e.g., by way of a graphical user interface) mapping application 600. Client device 700 may, for example, be disposed within managed network 300 and used to configure mapping application 600 to discover and/or map aspects of managed network 300.

Turning to FIG. 7A, client device 700 may be configured to transmit, to mapping application 600, a request for performance of discovery operations, as indicated by arrow 702. The request at arrow 702 may be generated, for example, based on and/or in response to user input received by way of client device 700. The request at arrow 702 may specify a subset of managed network 300 with respect to which the discovery operations are to be performed. For example, the request at arrow 702 may specify that the discovery operations are to collect software process data associated with software application executing within managed network 300.

Based on and/or in response to receiving the request at arrow 702, mapping application 600 may be configured to perform the discovery operations with respect to computing resources (e.g., software applications) in managed network 300, as indicated by block 704. Performance of discovery operations may also be caused in response to other triggers, such as a timer-based discovery schedule. Based on and/or in response to performance of the discovery operations at block 704, mapping application 600 may be configured to request storage of representation of discovered computing resources (e.g., software applications), as indicated by arrow 706. Based on and/or in response to reception of the request at arrow 706, persistent storage 602 may be configured to store the representations, as indicated by block 708. Thus, the operations of arrow 702 through block 708 may generate the representations of software applications 604-616 shown in FIG. 6. In some implementations, the representations may take the form of configuration items.

Client device 700 may be configured to transmit, to mapping application 600, a request for tagging of one or more software applications, as indicated by arrow 710. The request at arrow 710 may specify a particular software application to be tagged, may specify a particular group of two or more applications to be tagged, and/or may specify that tagging is to be performed with respect to all software applications represented in persistent storage 602. For clarity of illustration, aspects of FIGS. 7A and 7B are discussed with respect to a single software application. The request at arrow 710 may be generated based on and/or in response to user input received by way of a user interface, which may be configured to display one or more of the representation stored at block 708. In some cases, the request at arrow 710 may additionally specify one or more modifications to one or more parameters associated with letter case adjuster 620, character filter 622, stemming/lemmatization algorithm 624, tf-idf model 630, and/or candidate tag selector 636 to customize aspects of the tagging and/or mapping operations performed by mapping application 600 with respect to managed network 300 and/or subsets thereof.

Based on and/or in response to reception of the request at arrow 710, mapping application 600 may be configured to transmit, to persistent storage 602, a request for a representation of the software application to be tagged (specified by the request at arrow 710), as indicated by arrow 712. Specifically, the request at arrow 712 may be a request for textual data associated with the software application to be tagged. Based on and/or in response to reception of the request at arrow 712, persistent storage 602 may be configured to transmit, to mapping application 600, the representation of the software application, as indicated by arrow 714.

In some cases, the request at arrow 710 may be omitted, and mapping application 600 may be configured to generate candidate tags for the software application automatically (e.g., independently of user input). Additionally, in cases where mapping application 600 continues to store the representation of the software application (e.g., following discovery thereof at block 704), the operations of arrows 712 and/or 714 may be omitted.

Based on and/or in response to obtaining the representation of the software application (e.g., at block 704 and/or arrow 714), mapping application 600 may be configured to identify a plurality of character strings within the textual data included in the representation of the software application, as indicated by block 716. The plurality of character strings determined at block 716 may correspond to character strings 626-628 of FIG. 6, and may be determined in a similar and/or identical manner. Based on and/or in response to identification of the plurality of character strings, mapping application 600 may be configured to generate, for each character string, a corresponding frequency-based weight, as indicated by block 718. The frequency-based weights determined for the plurality of character strings at block 718 may correspond to character string weights 632-634 of FIG. 6, and may be determined in a similar and/or identical manner.

Based on and/or in response to generation of the frequency-based weights at block 718, mapping application 600 may be configured to select, based on the frequency-based weights, candidate tags for the software application, as indicated by block 720. For example, mapping application 600 may be configured to select up to a predetermined number of candidate tags. The candidate tags selected at block 720 may correspond to candidate tags 638-642 of FIG. 6, and may be determined in a similar and/or identical manner.

Based on and/or in response to selection of the candidate tags at block 720, mapping application 600 may be configured to transmit, to persistent storage 602, a request for storage of the candidate tags, as indicated by arrow 722. Based on and/or in response to reception of the request at arrow 722, persistent storage 602 may be configured to store the candidate tags, as indicated by block 724. For example, the candidate tags may be stored as part of the representation of the corresponding software application.

Turning to FIG. 7B, mapping application 600 may be configured to transmit, to client device 700, the candidate tags selected at block 720, as indicated by arrow 726. For example, the transmission at arrow 726 may be carried out based on and/or in response to selection of the candidate tags at block 720, storage of the candidate tags at block 724, and/or reception of a further request (not shown) from client device 700. Based on and/or in response to reception of the transmission at arrow 726, client device 700 may be configured to display the candidate tags by way of a user interface, as indicated by block 728.

Based on and/or in response to displaying of the candidate tags at block 728, client device 700 may be configured to receive a selection of a particular candidate tag from the displayed candidate tags, as indicated by block 730. The selection at block 730 may be received from a user and may represent the user's assignment of the particular tag to the software application, indicating that the selected tag is more specifically representative of the software application than other candidate tags. Based on and/or in response to reception of the selection at block 730, client device 700 may be configured to transmit, to mapping application 600, an indication of the particular candidate tag, as indicated by arrow 732. Alternatively, the selection of a particular candidate tag may be configured to occur automatically.

Mapping application 600 may be configured to generate a mapping between the software application and a computing resource, as indicated by block 734. Specifically, mapping application 600 may be configured to generate the mapping based on the candidate tags including a tag corresponding to the computing resource (i.e., generate the mapping automatically) and/or based on the particular tag selected at block 730 matching the tag corresponding to the computing resource (i.e., generate the mapping based on user input). The tag corresponding to the computing resource may have been assigned to the computing resource at an earlier time by way of one or more discovery and/or mapping operations, such as the NLP-based mapping operations discussed herein.

Based on and/or in response to generation of the mapping at block 734, mapping application 600 may be configured to transmit, to persistent storage 602, a request to store the mapping, as indicated by arrow 736. Based on and/or in response to reception of the request at arrow 736, persistent storage 602 may be configured to store the mapping, as indicated by block 738. The mapping may represent each of the software application and the computing resource as nodes, and the relationships therebetween may be represented by an edge connecting the nodes. A direction of the relationship (e.g., which node is the parent, and which is the child) may be determined based on one or more other attributes associated with and stored as part of the respective representations of the software application and the computing resource.

In some embodiments, mapping application 600 may be configured to obtain updated textual data for one or more of the tagged software applications. When the updated textual data for a software application differs from the prior textual data, the operations described herein (e.g., a subset of the operations of FIGS. 7A and 7B) may be repeated to generate updated candidate tags for the software application. When the updated candidate tags for the software application differ from the prior candidate tags, the updated candidate tags may replace the prior candidate tags and/or may be added to the prior candidate tags. Based on the updated candidate tags, the mapping between the software application and other computing resources may be updated. Updating the mapping may include removing existing relationships between the software application and one or more computing resources mapped thereto, and/or adding new relationships between the software application and one or more other computing resources.

VI. EXAMPLE OPERATIONS

Figure 8:
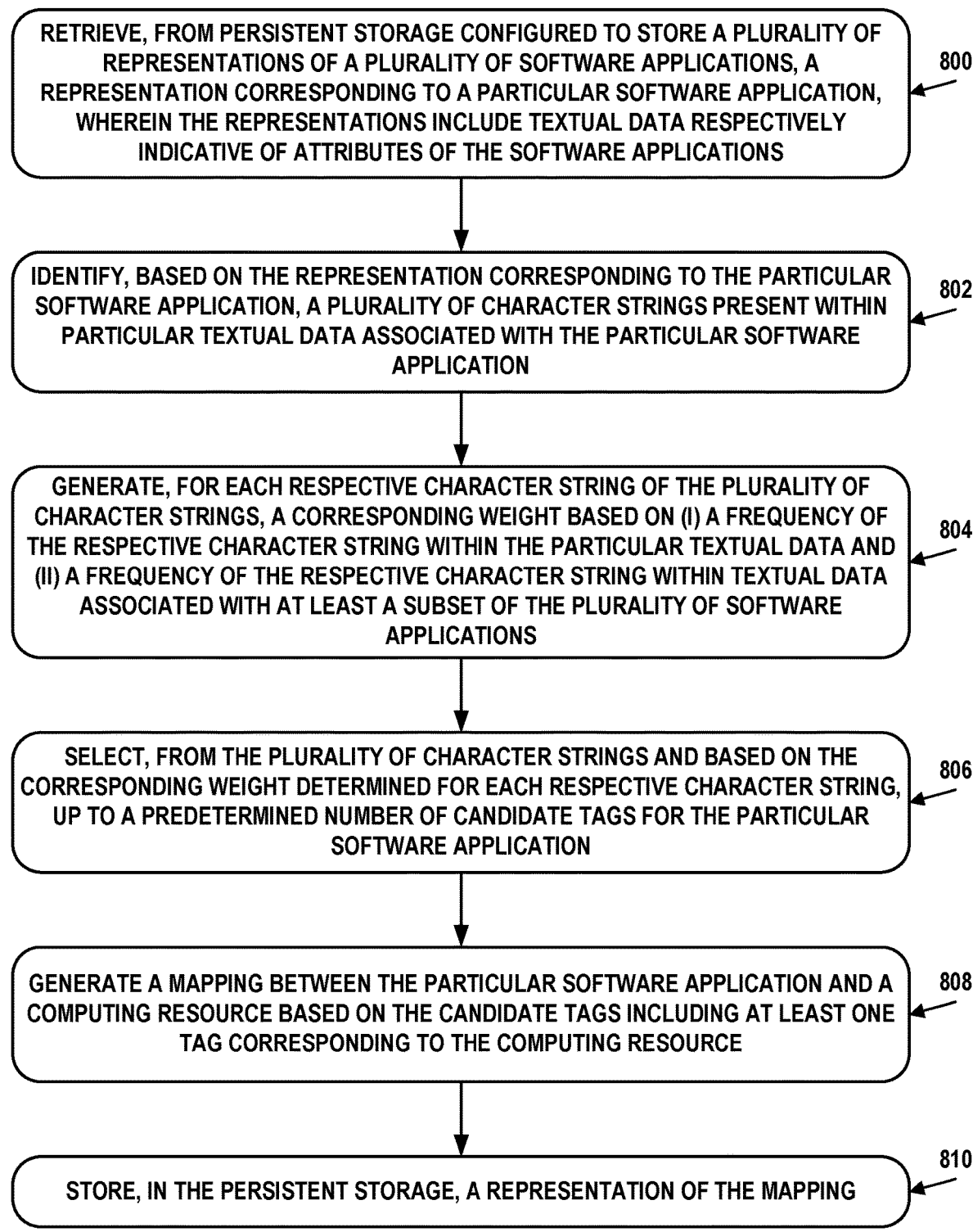
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform, mapping application 600, or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may include retrieving, from persistent storage configured to store a plurality of representations of a plurality of software applications, a representation corresponding to a particular software application. The representations may include textual data respectively indicative of attributes of the software applications.

Block 802 may include identifying, based on the representation corresponding to the particular software application, a plurality of character strings present within particular textual data associated with the particular software application.

Block 804 may include generating, for each respective character string of the plurality of character strings, a corresponding weight based on (i) a frequency of the respective character string within the particular textual data and (ii) a frequency of the respective character string within textual data associated with at least a subset of the plurality of software applications.

Block 806 may include selecting, from the plurality of character strings and based on the corresponding weight determined for each respective character string, up to a predetermined number of candidate tags for the particular software application.

Block 808 may include generating a mapping between the particular software application and a computing resource based on the candidate tags including at least one tag corresponding to the computing resource.

Block 810 may include storing, in the persistent storage, a representation of the mapping.

In some embodiments, the predetermined number of candidate tags may include a plurality of candidate tags. The plurality of candidate tags for the particular software application may be displayed by way of a user interface. A selection of a particular tag of the plurality of candidate tags may be received by way of the user interface and for the particular software application. The mapping between the particular software application and the computing resource may be generated based on the particular tag matching the at least one tag corresponding to the computing resource.

In some embodiments, generating the mapping between the particular software application and the computing resource may include obtaining, from the persistent storage, a plurality of tags corresponding to a plurality of computing resources, comparing the candidate tags to the plurality of tags, and determining, based on comparing the candidate tags to the plurality of tags, that the at least one tag corresponding to the computing resource of the plurality of computing resources matches a particular tag of the candidate tags.

In some embodiments, it may be determined that the particular textual data has been updated. Based on determining that the particular textual data has been updated, a second plurality of character strings present within the particular textual data as updated may be identified. A corresponding weight may be generated for each given character string of the second plurality of character strings based on (i) a frequency of the given character string within the particular textual data as updated and (ii) a frequency of the given character string within the textual data associated with at least a subset of the plurality of software applications. Up to the predetermined number of updated candidate tags for the particular software application may be selected from the second plurality of character strings based on the corresponding weight determined for each given character string. An updated mapping between the particular software application and a second computing resource may be generated based on the updated candidate tags including at least one tag corresponding to the second computing resource. A representation of the mapping as updated may be stored in the persistent storage.

In some embodiments, identifying the plurality of character strings present within the particular textual data may include removing, from the particular textual data, one or more occurrences of one or more predetermined characters, adjusting a letter case of one or more characters in the particular textual data, and/or generating a root form of one or more words in the particular textual data by processing the particular textual data by way of one or more of: (i) a stemming algorithm or (ii) a lemmatization algorithm.

In some embodiments, generating the corresponding weight may include determining a product of (i) the frequency of the respective character string within the particular textual data and (ii) an inverse of the frequency of the respective character string within the textual data associated with at least the subset of the plurality of software applications.

In some embodiments, the predetermined number of candidate tags may include N candidate tags. Selecting up to the predetermined number of candidate tags for the particular software application may include selecting a subset of the plurality of character strings, where each respective character string of the subset may be associated with a corresponding weight that exceeds a threshold weight, and selecting, from the subset of the plurality of character string, up to N character strings associated with up to N highest corresponding frequencies within the particular textual data.

In some embodiments, the representation corresponding to the particular software application may be updated based on the candidate tags. The representation as updated may be stored in the persistent storage.

In some embodiments, the particular textual data associated with the particular software application may include software process data generated by an operating system in connection with execution of the particular software application. The software process data may include one or more of: (i) a name of an executable file used to cause execution of the particular software application, (ii) a file system path indicative of a location of the executable file, (iii) a command used to cause execution of the particular software application, or (iv) one or more arguments provided as input to the particular software application.

In some embodiments, the computing resource may include at least one of: (i) a software service provided at least in part by the particular software application or (ii) a server device configured to execute at least part of the particular software application.

In some embodiments, each software application of the plurality of software applications may be associated with a corresponding managed network. The particular software application may be associated with a particular managed network. The subset of the plurality of software applications may include software applications associated with the particular managed network.

In some embodiments, each software application of the plurality of software applications may be associated with a corresponding managed network. The particular software application may be associated with a particular managed network. The subset of the plurality of software applications may include software applications associated with at least one managed network other than the particular managed network.

In some embodiments, the particular software application and the subset of the plurality of software applications may be configured to be executed by one or more computing resources disposed in a particular managed network. The mapping application may be configured to be executed by a computational instance of a remote network management platform configured to manage the particular managed network.

VII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   persistent storage configured to store a plurality of representations of a plurality of software applications, wherein the representations include textual data respectively indicative of attributes of the plurality of software applications; and
   a mapping application configured to perform operations comprising:
      retrieving, from the persistent storage, a representation corresponding to a particular software application that belongs to a particular managed network of a plurality of different managed networks;
      identifying, based on the representation corresponding to the particular software application, a plurality of character strings present within particular textual data associated with the particular software application;
      generating, for each respective character string of the plurality of character strings, a corresponding weight based on a product of: (i) a corresponding frequency of the respective character string within the particular textual data and (ii) an inverse of a frequency of the respective character string within textual data associated with a subset of the plurality of software applications that comprises software applications that belong to the particular managed network, wherein the corresponding weight indicates an extent to which the respective character string is descriptive of the particular software application within the particular managed network;
      selecting a subset of the plurality of character strings based on the corresponding weight determined for each respective character string of the plurality of character strings, wherein each respective character string of the subset is associated with a corresponding weight that exceeds a threshold weight;
      selecting, from the subset of the plurality of character strings and based on the corresponding frequency within the particular textual data of each respective character string of the subset, up to a predetermined number of network-specific candidate tags for the particular software application, wherein the predetermined number of network-specific candidate tags comprises up to N character strings associated with up to N highest corresponding frequencies within the particular textual data, and wherein the corresponding frequency indicates an extent to which the respective character string is descriptive of the particular software application within a context of the particular software application;
      generating a mapping between the particular software application and a computing resource that belongs to the particular managed network based on the network-specific candidate tags including at least one tag corresponding to the computing resource; and
      storing, in the persistent storage, a representation of the mapping.

2. The computing system of claim 1, wherein the predetermined number of network-specific candidate tags comprises a plurality of network-specific candidate tags, and wherein the operations further comprise:
   displaying, by way of a user interface, the plurality of network-specific candidate tags for the particular software application; and
   receiving, by way of the user interface and for the particular software application, a selection of a particular tag of the plurality of network-specific candidate tags, wherein the mapping between the particular software application and the computing resource is generated based on the particular tag matching the at least one tag corresponding to the computing resource.

3. The computing system of claim 1, wherein generating the mapping between the particular software application and the computing resource comprises:
   obtaining, from the persistent storage, a plurality of tags corresponding to a plurality of computing resources;
   comparing the network-specific candidate tags to the plurality of tags; and
   determining, based on comparing the network-specific candidate tags to the plurality of tags, that the at least one tag corresponding to the computing resource of the plurality of computing resources matches a particular tag of the network-specific candidate tags.

4. The computing system of claim 1, wherein the operations further comprise:
   determining that the particular textual data has been updated;
   based on determining that the particular textual data has been updated, identifying a second plurality of character strings present within the particular textual data as updated;
   generating, for each given character string of the second plurality of character strings, a corresponding weight based on a product of: (i) a corresponding frequency of the given character string within the particular textual data as updated and (ii) an inverse of a frequency of the given character string within the textual data associated with the subset of the plurality of software applications that belong to the particular managed network;

selecting, from the second plurality of character strings and based on the corresponding weight determined for each given character string, up to the predetermined number of updated network-specific candidate tags for the particular software application;

generating an updated mapping between the particular software application and a second computing resource based on the updated network-specific candidate tags including at least one tag corresponding to the second computing resource; and storing, in the persistent storage, a representation of the mapping as updated.

5. The computing system of claim 1, wherein identifying the plurality of character strings present within the particular textual data comprises:

removing, from the particular textual data, one or more occurrences of one or more predetermined characters;

adjusting a letter case of one or more characters in the particular textual data; and generating a root form of one or more words in the particular textual data by processing the particular textual data by way of one or more of: (i) a stemming algorithm or (ii) a lemmatization algorithm.

6. The computing system of claim 1, wherein the operations further comprise:

updating the representation corresponding to the particular software application based on the network-specific candidate tags; and storing, in the persistent storage, the representation as updated.

7. The computing system of claim 1, wherein the particular textual data associated with the particular software application comprises software process data generated by an operating system in connection with execution of the particular software application, and wherein the software process data comprises one or more of: (i) a name of an executable file used to cause execution of the particular software application, (ii) a file system path indicative of a location of the executable file, (iii) a command used to cause execution of the particular software application, or (iv) one or more arguments provided as input to the particular software application.

8. The computing system of claim 1, wherein the computing resource comprises at least one of: (i) a software service provided at least in part by the particular software application or (ii) a server device configured to execute at least part of the particular software application.

9. The computing system of claim 1, wherein each software application of the plurality of software applications belongs to a corresponding managed network of the plurality of different managed networks, and wherein the plurality of software applications comprises software applications associated with at least one managed network other than the particular managed network.

10. The computing system of claim 1, wherein the particular software application and the subset of the plurality of software applications are configured to be executed by one or more computing resources disposed in the particular managed network, and wherein the mapping application is configured to be executed by a computational instance of a remote network management platform configured to manage the particular managed network.

11. A computer-implemented method comprising:

retrieving, from persistent storage configured to store a plurality of representations of a plurality of software applications, a representation corresponding to a particular software application that belongs to a particular managed network of a plurality of different managed networks, wherein the representations include textual data respectively indicative of attributes of the plurality of software applications;

identifying, based on the representation corresponding to the particular software application, a plurality of character strings present within particular textual data associated with the particular software application;

generating, for each respective character string of the plurality of character strings, a corresponding weight based on a product of: (i) a corresponding frequency of the respective character string within the particular textual data and (ii) an inverse of a frequency of the respective character string within textual data associated with a subset of the plurality of software applications that comprises software applications that belong to the particular managed network, wherein the corresponding weight indicates an extent to which the respective character string is descriptive of the particular software application within the particular managed network;

selecting a subset of the plurality of character strings based on the corresponding weight determined for each respective character string of the plurality of character strings, wherein each respective character string of the subset is associated with a corresponding weight that exceeds a threshold weight;

selecting, from the subset of the plurality of character strings and based on the corresponding frequency within the particular textual data of each respective character string of the subset, up to a predetermined number of network-specific candidate tags for the particular software application, wherein the predetermined number of network-specific candidate tags comprises up to N character strings associated with up to N highest corresponding frequencies within the particular textual data, and wherein the corresponding frequency indicates an extent to which the respective character string is descriptive of the particular software application within a context of the particular software application;

generating a mapping between the particular software application and a computing resource that belongs to the particular managed network based on the network-specific candidate tags including at least one tag corresponding to the computing resource; and storing, in the persistent storage, a representation of the mapping.

12. The computer-implemented method of claim 11, wherein the predetermined number of network-specific candidate tags comprises a plurality of network-specific candidate tags, and wherein the method further comprises:

displaying, by way of a user interface, the plurality of network-specific candidate tags for the particular software application; and receiving, by way of the user interface and for the particular software application, a selection of a particular tag of the plurality of network-specific candidate tags, wherein the mapping between the particular software application and the computing resource is generated based on the particular tag matching the at least one tag corresponding to the computing resource.

13. The computer-implemented method of claim 11, wherein identifying the plurality of character strings present within the particular textual data comprises:

removing, from the particular textual data, one or more occurrences of one or more predetermined characters;

adjusting a letter case of one or more characters in the particular textual data; and generating a root form of one or more words in the particular textual data by processing the particular textual data by way of one or more of: (i) a stemming algorithm or (ii) a lemmatization algorithm.

14. The computer-implemented method of claim 11, wherein the particular textual data associated with the particular software application comprises software process data generated by an operating system in connection with execution of the particular software application, and wherein the software process data comprises one or more of: (i) a name of an executable file used to cause execution of the particular software application, (ii) a file system path indicative of a location of the executable file, (iii) a command used to cause execution of the particular software application, or (iv) one or more arguments provided as input to the particular software application.

15. The computer-implemented method of claim 11, wherein generating the mapping between the particular software application and the computing resource comprises:

obtaining, from the persistent storage, a plurality of tags corresponding to a plurality of computing resources;

comparing the network-specific candidate tags to the plurality of tags; and determining, based on comparing the network-specific candidate tags to the plurality of tags, that the at least one tag corresponding to the computing resource of the plurality of computing resources matches a particular tag of the network-specific candidate tags.

16. The computer-implemented method of claim 11, further comprising:

updating the representation corresponding to the particular software application based on the network-specific candidate tags; and storing, in the persistent storage, the representation as updated.

17. An article of manufacture including a non-transitory computer-readable medium, having stored thereon program instructions that, upon execution by a computing system, cause the computing system to perform operations comprising:

retrieving, from persistent storage configured to store a plurality of representations of a plurality of software applications, a representation corresponding to a particular software application that belongs to a particular managed network of a plurality of different managed networks, wherein the representations include textual data respectively indicative of attributes of the plurality of software applications;

identifying, based on the representation corresponding to the particular software application, a plurality of character strings present within particular textual data associated with the particular software application;

generating, for each respective character string of the plurality of character strings, a corresponding weight based on a product of: (i) a corresponding frequency of the respective character string within the particular textual data and (ii) an inverse of a frequency of the respective character string within textual data associated with a subset of the plurality of software applications that comprises software applications that belong to the particular managed network, wherein the corresponding weight indicates an extent to which the respective character string is descriptive of the particular software application within the particular managed network;

selecting a subset of the plurality of character strings based on the corresponding weight determined for each respective character string of the plurality of character strings, wherein each respective character string of the subset is associated with a corresponding weight that exceeds a threshold weight;

selecting, from the subset of the plurality of character strings and based on the corresponding frequency within the particular textual data of each respective character string of the subset, up to a predetermined number of network-specific candidate tags for the particular software application, wherein the predetermined number of network-specific candidate tags comprises up to N character strings associated with up to N highest corresponding frequencies within the particular textual data, and wherein the corresponding frequency indicates an extent to which the respective character string is descriptive of the particular software application within a context of the particular software application;

generating a mapping between the particular software application and a computing resource that belongs to the particular managed network based on the network-specific candidate tags including at least one tag corresponding to the computing resource; and storing, in the persistent storage, a representation of the mapping.

18. The article of manufacture of claim 17, wherein the predetermined number of network-specific candidate tags comprises a plurality of network-specific candidate tags, and wherein the operations further comprise:

displaying, by way of a user interface, the plurality of network-specific candidate tags for the particular software application; and receiving, by way of the user interface and for the particular software application, a selection of a particular tag of the plurality of network-specific candidate tags, wherein the mapping between the particular software application and the computing resource is generated based on the particular tag matching the at least one tag corresponding to the computing resource.

19. The article of manufacture of claim 17, wherein generating the mapping between the particular software application and the computing resource comprises:

obtaining, from the persistent storage, a plurality of tags corresponding to a plurality of computing resources;

comparing the network-specific candidate tags to the plurality of tags; and determining, based on comparing the network-specific candidate tags to the plurality of tags, that the at least one tag corresponding to the computing resource of the plurality of computing resources matches a particular tag of the network-specific candidate tags.

20. The article of manufacture of claim 17, wherein the operations further comprise:

updating the representation corresponding to the particular software application based on the network-specific candidate tags; and storing, in the persistent storage, the representation as updated.

* * * * *